(12) United States Patent
 Odaira

(10) Patent No.: US 9,218,191 B2
(45) Date of Patent: Dec. 22, 2015

(54) INFORMATION PROCESSING APPARATUS AND PROGRAM AND METHOD FOR ADJUSTING INITIAL ARRAY SIZE

(71) Applicant: INTERNATIONAL BUSINESS MACHINES CORPORATION, Armonk, NY (US)

(72) Inventor: Rei Odaira, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 13/688,996

(22) Filed: Nov. 29, 2012

(65) Prior Publication Data

US 2013/0139133 A1    May 30, 2013

(30) Foreign Application Priority Data

Nov. 30, 2011    (JP) .................................. 2011-261775

(51) Int. Cl.
 *G06F 9/44*     (2006.01)
 *G06F 9/455*    (2006.01)
 *G06F 12/06*    (2006.01)

(52) U.S. Cl.
 CPC ........ *G06F 9/45516* (2013.01); *G06F 12/0646* (2013.01)

(58) Field of Classification Search
 None
 See application file for complete search history.

(56) References Cited

U.S. PATENT DOCUMENTS

2004/0168027 A1    8/2004  Hu et al.
2010/0174520 A1    7/2010  Kojima

FOREIGN PATENT DOCUMENTS

| JP | 5204616 A   | 8/1993 |
| JP | 2000066900 A | 3/2000 |
| JP | 2003271393 A | 9/2003 |
| JP | 2004259007   | 9/2004 |

OTHER PUBLICATIONS

Eran Yahav et al. Chameleon: Adaptive Selection of Collections, published Jun. 2009 http://www.cs.technion.ac.il/~yahave/papers/pldi09.pdf.*

(Continued)

*Primary Examiner* — Don Wong
*Assistant Examiner* — Deric Ortiz
(74) *Attorney, Agent, or Firm* — Tutunjian & Bitetto, P.C.; Jennifer R. Davis

(57) ABSTRACT

An adjustment apparatus includes a storage device, an execution target program, an execution unit, a first API, a second API, a profiler, and a dynamic compiler. The execution unit interprets the program, and calls and executes a function of an API in response to the API description. The first and second API are callable by the execution unit, to respectively allocate an array of a predetermined size, and extend the array. The first and second APIs are converted into code to store an array allocation call context of the pre-extension array into a profile information storage area of the allocated array. The profiler profiles access to arrays. The dynamic compiler inline-expands an array allocation call context included in a code part to be dynamically compiled and embeds an array size determined based on context based access information, as an allocation initial size of the array, into the code part.

13 Claims, 14 Drawing Sheets

(56) References Cited

OTHER PUBLICATIONS

"Chameleon: Adaptive Selection of Collections" by Eran Yahav et al., Jun. 2009 (http://www.cs.technion.ac.il/~yahave/papers/pldi09.pdf).*

Shacham, O., et al. "Chameleon: Adaptive Selection of Collections" Proceedings of the 2009 ACM SIGPLAN Conference on Programming Language Design and Implementation (PLDI '09). Jun. 2009. P(11 ages).

* cited by examiner

Figure 3A

```
public final class System {
public static char[] getCharArrayOfBestSize(int defaultSize) {
    return new char[defaultSize];
}
public static char[] extendCharArray(int newSize, char[] oldArray) {
    return new char[newSize];
}
}
```

Figure 3B

```
System_getCharArrayOfBestSize:
        Allocate a character-type array of defaultSize;
        Initialize the allocated array;
        if (sample the allocated array){
                Determine the allocated array as an array to be profiled by the
access profiler;
                Record an allocation call contest of the allocated array;
        }
Return the allocated array;
```

Figure 3C

```
System_extendCharArray:
        Allocate a character-type array of newSize;
        Initialize the allocated array;
        if (oldArray is to be profiled) {
        Determine the allocated array as an array to be profiled by the access
profiler;
        Set an allocation call context of oldArray as an allocation call contest
of the allocated array;
        }
Return the allocated array;
```

Figure 4

```
public class StringBuilder {
char[] value; Int count;
public StringBuilder() {
    value = System.getCharArrayOfBestSize(16); //('a') Allocate an array of an initial size
    count = 0;
}
public StringBuilder append(char ch) {
    if (count >= value.length) {
        char[ ] newValue = System.extendCharArray(value.length * 2, value);
                //('b') Allocate an array of an extended size
        System.arraycopy(value, 0, newValue, 0, count);
        value = newValue;
    }
    value[count] = ch;
    count++;
    return this;
}
}
```

Figure 5A

```
class MySample1 {
void method1() {
  StringBuilder sb1 = new StringBuilder();
  sb1.append(' a ');
  if (...)
    sb1.append(' b ');
    ...
}
}
```

Figure 5B

| Index of last accessed element in array | Frequency |
|---|---|
| 0 | 15 |
| 1 | 10 |

Figure 5C

```
MySample1_method1:
// Inline-expanded code of getCharArrayOfBestsize()
    Allocate a character-type array of size of 2;
    Initialize the allocated array;
    if (sample the allocated array) {
            Determine the allocated array as an array to be profiled by the access profiler;
            Record an allocation call context of the allocated array;
    }
    ...
```

Figure 6A

```
class MySample2 {
void method2(Reader rd) {
  StringBuilder sb2 = new StringBuilder();
  int ch;
  while ((ch = rd.read()) != -1)
    sb2.append(ch);
    ...
}
}
```

Figure 6B

| Index of last accessed element in array | Frequency |
|---|---|
| 1499 | 8 |
| 1319 | 5 |
| 1659 | 4 |
| 909 | 7 |

Figure 6C

```
MySample2_method2:
// Inline-expanded code of getCharArrayOfBestsize()
        Allocate a character-type array of size of 1660;
        Initialize the allocated array;
        if (sample the allocated array) {
                Determine the allocated array as an array to be profiled by the access profiler;
                Record an allocation call context of the allocated array;
        }
        ...
```

Figure 13 (Prior art)

```
public class StringBuilder {
char[ ] value; Int count;
public StringBuilder() {
        value = new char[16]; //(a) At first, allocate an array of a predetermined small size
        count = 0;
}
public StringBuilder append(char ch) {
        if (count >= value.length) {
        char[ ] newValue = new char[value.length *2]; //(b) Extend the array
        System.arraycopy(value, 0, newValue, 0, count);
        value = newValue;
        }
        value[count] = ch;
        count++;
        return this;
}
}
```

Figure 14

```
public class StringBuilder {
char[ ] value; Int count;
public StringBuilder() {
        @GetCharArrayOfBestSize
        value = new char[16]; //(a) At first, allocate an array of a predetermined small size
        count = 0;
}
... // Hereinafter, description will be omitted.
```

Figure 15

```
public final class System {
public native static char[] getCharArrayOfBestSize(int defaultSize);
public native static char[] extendCharArray(int newsize, char[] oldArray);
}
```

INFORMATION PROCESSING APPARATUS AND PROGRAM AND METHOD FOR ADJUSTING INITIAL ARRAY SIZE

TECHNICAL FIELD

The present invention relates to a technique of adjusting an initial size of an array, and more specifically to an information processing apparatus, an adjustment program and an adjustment method for dynamically adjusting an initial size of an array in an execution environment.

BACKGROUND ART

Conventionally, when an appropriate array size is unknown in allocating an array, a programming pattern (hereinafter, referred to as an "array extension pattern") is used in which an array of a small size is at first allocated, and as occasion demands, an array of an extended size is allocated. FIG. 13 shows an example of the array extension pattern. In a StringBuilder class shown in FIG. 13, a constructor firstly allocates a char[ ] array having elements of 16 (see (a) in FIG. 13). Then, in setting a value in an element of the char[ ] array by an append method, an if statement is used to judge whether or not the array needs to be extended. When the if statement holds true, a newchar[ ] array of a double size is newly allocated (see (b) in FIG. 13). Values of the elements of the original array char[ ] are copied to elements of the newly allocated array newchar[ ].

However, the use of the aforementioned programming pattern causes a problem of unnecessary execution, because the initial size of the array is often too large or too small. In particular, when being allocated frequently due to their short lives, arrays suffer from high overhead in zero initialization and copying.

Non-patent Literature 1 exists as a conventional technique relating to a method of selecting an initial size of a variable length object. Non-patent Literature 1 discloses the following method of selecting an initial size, focusing on a collection object as a variable length object. 1. When a collection object is allocated, a call context therefor is acquired and is recorded in an object information structure of the allocated collection object. 2. The type and the number of times of method calls for the collection object are recorded in the corresponding object information structure. 3. When the collection object is discarded, records of the corresponding object information structure are summarized, and the results are stored in a per-allocation-call-context information structure. 4. After the end of program execution, an appropriate initial size of the collection object is proposed to a programmer based on the summarization results.

Hence, suppose that the technique disclosed in Non-patent Literature 1 described above is applied to processing of determining an initial array size. Information of access to an array allocated at the two code parts (a) and (b) shown in FIG. 13 and allocation call context information of the array are recorded in corresponding object information structures, and the recorded information is summarized to be stored in the per-allocation-call-context information structure. Thereby, an appropriate initial size of the arrays allocated at the parts (a) and (b) can be proposed to the programmer. In this case, however, profile information of the recorded information can be summarized only on an allocation call context basis. Accordingly, feedback of the profile information of the array allocated at the part (b) cannot be given to an allocation call context of the array allocated at the part (a). This can consequently avoid allocation of too large arrays in the parts (a) and (b), but cannot eliminate array extension processing and reduce the number of times thereof.

Hereinbelow, descriptions are given of other literature found in a prior art research for the present invention.

Patent Literature 1 discloses the following technique. Specifically, the size of a variable length instance of an inline-allocation source is predicted by a method using an execution profile or the like. For example, suppose a case of predicting that the size of an array is 4. When the array length which is determined during execution is 4 or smaller, the array is inline-allocated in an inline-allocation destination instance. When the array length exceeds 4, the array is allocated separately from the allocation destination instance. However, in the technique in Patent Literature 1, the size of the variable length object to be allocated is profiled at each allocation code part, and there is no consideration for which element of the variable length object is actually accessed during the execution. Accordingly, the technique in Patent Literature 1 cannot optimize the array extension pattern.

Patent Literature 2 discloses an array area reservation apparatus including a calculation unit and an execution unit. Specifically, in a case where a memory space needs to be changed during execution of a program, the calculation unit refers to an environment setting file, and thereby calculates an optimum array length value required in the program, on the basis of the maximum or minimum array length in the environment setting file and an actual memory of a machine executing the program. The execution unit then changes the array length in the source program, and recompiles and executes the program. The technique in Patent Literature 2, however, is a technique of adjusting the size of the array to be allocated in the program according to the memory space of the machine executing the program, and is not a technique of adjusting the size according to elements of a variable length object actually accessed during the execution. Accordingly, the technique in Patent Literature 2 cannot optimize the array extension pattern.

Patent Literature 3 discloses a first method of dynamically reserving or releasing an array area in the C++ language. A memory management table and the size thereof are implemented as private member variables. The memory management table stores a pointer to a pointer array, the pointer pointing at the start of the pointer array to a data area, the pointer array including pointers pointing at lines of the data area in an array. In addition, an initialization function constructor, a memory reservation function, a memory release function, and a release function destructor are implemented as public member functions, the initialization function constructor being configured to initialize the memory management table, the memory reservation function being configured to reserve and allocate an array area, the memory release function being configured to release the area, the release function destructor being configured to release the data area and the array of pointers to the data area by using the memory release function. The technique in Patent Literature 3, however, is a technique for setting the size of a high-dimensional array in a multi-dimensional array as a run-time variable, instead of a compilation-time constant. With this technique, an allocated array is not extended during execution. Accordingly, the technique in Patent Literature 3 cannot optimize the array extension pattern.

CITATION LIST

[Patent Literature 1] Japanese Patent Application Publication No. 2003-0271393

[Patent Literature 2] Japanese Patent Application Publication No. 1993-0204616

[Patent Literature 3] Japanese Patent Application Publication No. 2000-0066900

Non Patent Literature

[Non-patent Literature 1] O. Shacham, M. Vechev, E. Yahav, "Chameleon: Adaptive Selection of Collections.", PLDI '09 ACM SIGPLAN Conference on Programming Language Design and Implementation Dublin, Ireland, 2009, pp. 408-418

SUMMARY

The present invention has been made to solve the foregoing problems, and aims to provide an information processing apparatus, an adjustment program and an adjustment method for dynamically adjusting an initial size of an array in an array extension pattern in an execution environment.

To solve these problems, the present invention provides an adjustment program for dynamically adjusting an initial size of an array. The program causes a computer to execute the steps of: (a) allocating an array of a predetermined size in response to an array allocation request from an execution target program, and storing allocation call context information of the array into a profile information storage area of the array; (b) newly allocating, as an extended array, an array of a larger size than the predetermined size in response to a request to extend the size of the allocated array from the execution target program, and storing the allocation call context information of the original pre-extension array into the profile information storage area of the extended array; (c) in response to an access to a profile target array during execution of the execution target program, storing access information into the profile information storage area of the profile target array; (d) collecting the access information stored in the profile information storage areas of arrays for each array allocation call context; and (e) in response to dynamic compilation of a code part to be executed next in the execution target program, inline-expanding an array allocation call context included in the code part, and embedding an array size determined based on the access information collected for the context, as an allocation initial size of the array, into the inline-expanded code.

Preferably, the access information stored in the profile information storage area of each of the arrays is an index value of an element located at the end in accessed elements of the each array, and the step (e) includes the step of determining, as the allocation initial size of the array, the largest index value in a plurality of index values which are the collected access information.

Preferably, the access information stored in the profile information storage area of each of the arrays is an index value of an element located at the end in accessed elements of the each array, and the step (e) includes the step of determining, as the allocation initial size of the array, an index value corresponding to the highest frequency in a plurality of index values which are the collected access information.

Preferably, the profile information storage area of each of the arrays is associated with a pointer to the start of the each array, and the step (b) includes the steps of receiving the pointer to the start of the array as well as a request for size extension of the array and acquiring array allocation call context information of the original array by using the received pointer, the array allocation call context information being stored in the profile information storage area of the original array.

Preferably, the collection in the step (d) is performed on the profile target array which is to be discarded in garbage collection processing.

The present invention has been heretofore described as an adjustment program for dynamically adjusting the initial size of the array. However, the present invention may be taken as a method of dynamically adjusting the initial size of the array, the method being executed by a computer having the aforementioned adjustment program installed thereon. In addition, the present invention may be taken as an information apparatus (hereinafter, referred to as an "adjustment apparatus") for dynamically adjusting the initial size of the array, the adjustment apparatus being implemented by installing the aforementioned adjustment program thereon.

In the present invention, when being recorded, profile information of an array of an extended size is associated with an allocation call context of the original pre-extension array, instead of the extended array. As the result, feedback of the profile information of the extended array can be given to the allocation call context of the original pre-extension array, and thus an appropriate initial array size making it possible to reduce extension processing can be dynamically determined in an execution environment. Other advantageous effects of the present invention will be understood from a description of an embodiment.

BRIEF DESCRIPTION OF DRAWINGS

FIG. 3A shows an example of new APIs provided as part of a standard library.

FIG. 3B shows an example of code compiled during execution of getCharArrayOfBestSize( ).

FIG. 3C shows an example of code compiled during execution of extendCharArray( ).

FIG. 4 shows an example of StringBuilder using new APIs shown in FIG. 3A.

FIG. 5A shows an example of a program for generating an array by using StringBuilder shown in FIG. 4.

FIG. 5B shows an example of results of profiling an array allocated in the third line of FIG. 5A.

FIG. 5C shows code inline-expanded by referring to the profiling results shown in FIG. 5B.

FIG. 6A shows another example of a program for generating an array by using StringBuilder shown in FIG. 4.

FIG. 6B shows an example of results of profiling an array allocated in the third line of FIG. 6A.

FIG. 6C shows code inline-expanded by referring to the profiling results shown in FIG. 6B.

FIG. 13 shows an example of a program showing a conventional array expansion pattern.

FIG. 14 shows an example of a program using an API specifying an allocation location by using an annotation.

FIG. 15 shows an example of a new API provided as a native library.

DESCRIPTION OF PREFERRED EMBODIMENTS

Figure 1A:
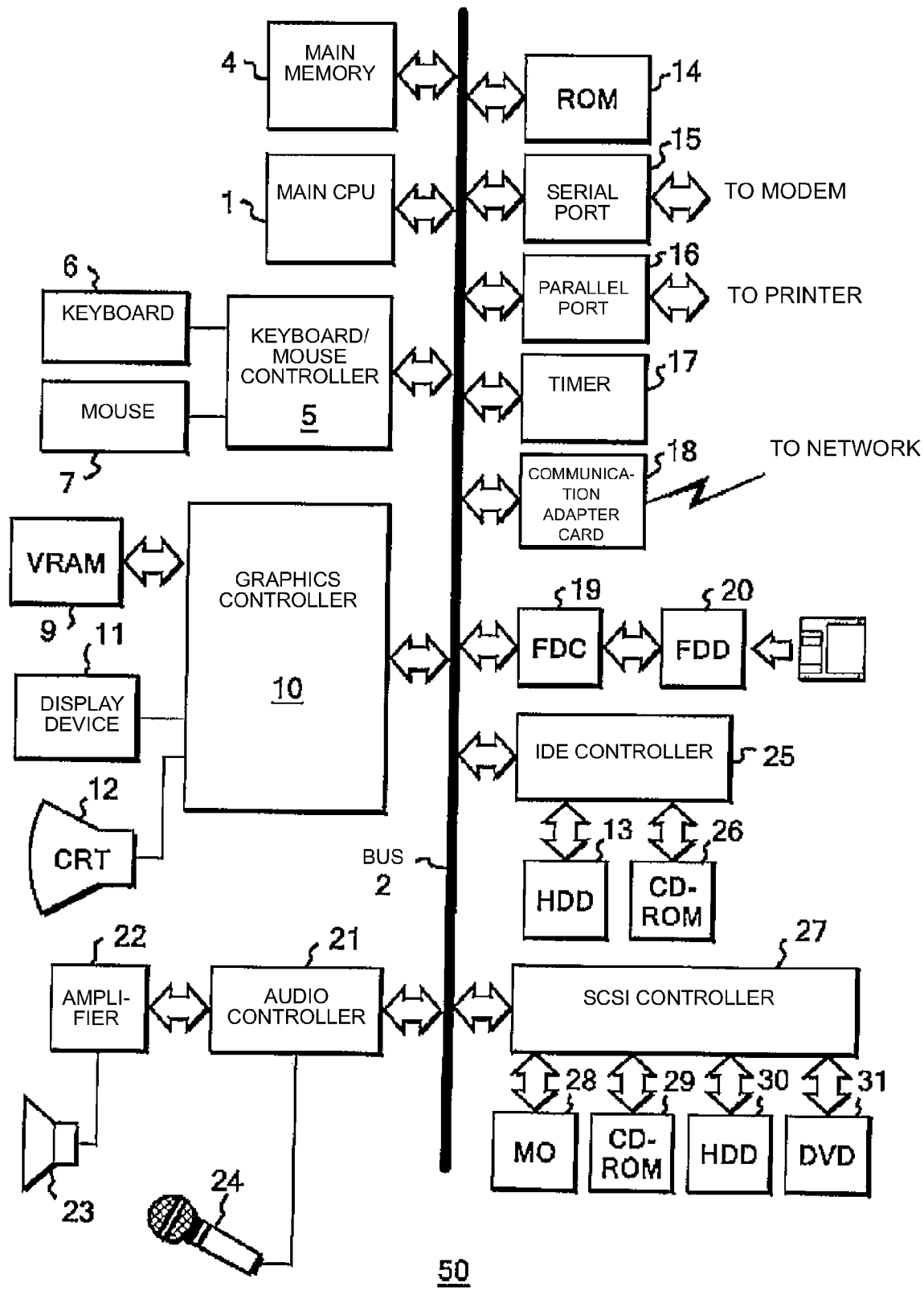
FIG. 1A shows an example of a hardware configuration of a computer 50 according to an embodiment of the present invention.

Hereinbelow, embodiments of the present invention will be described in detail based on the drawings. The following embodiments, however, do not restrict the invention according to the scope of the claims, and the complete combination of the characteristics described in the embodiments is not necessarily indispensable for the solving means of the present invention. Note that the same constituents are denoted by the same reference numerals through the whole description of the embodiments.

FIG. 1A shows an example of a hardware configuration of a computer 50 that is an information processing apparatus according to the embodiment of the present invention. The computer 50 includes a main central processing unit (CPU) 1 and a main memory 4 that are connected to a bus 2. The CPU 1 is preferably based on a 32-bit or 64-bit architecture and, for example, the following may be used as the CPU 1: Intel's Core i (trademark) series, Core 2 (trademark) series, Atom (trademark) series, Xeon (registered trademark) series, Pentium (registered trademark) series, and Celeron (registered trademark) series; and AMD's Phenom (trademark) series, Athlon (trademark) series, Turion (trademark) series, and Sempron (trademark) series.

Hard disk devices 13, 30, removable storages (a recording-medium-exchangeable external storage system) such as CD-ROM devices 26, 29, a flexible disk device 20, an MO device 28, and a DVD device 31 are connected to the bus 2 via a flexible disk controller 19, an IDE controller 25, a SCSI controller 27, and the like. Such storage media as a flexible disk, an MO, a CD-ROM, and a DVD-ROM are inserted into the removable storages.

The recording media, the hard disk devices 13, 30 and the ROM 14 store an operating system, programs for providing Java (registered trademark) processing environment such as J2EE, a Java (registered trademark) application, a Java (registered trademark) virtual machine (VM), and a Java (registered trademark) JIT compiler, other programs, and data, so as to be loadable onto the main memory 4. Further, the storage media, the hard disk devices 13, 30, and the ROM 14 can record therein a computer program for implementing the present invention by giving instructions to the CPU 1 in cooperation with the operating system. In other words, the various storage devices described above can record therein an adjustment program which is installed on the computer 50 and data to cause the computer to function as an adjustment apparatus 200 according to embodiments of the present invention.

The adjustment program includes an array generation module, an extended-array generation module, a mark setting module, an initialization module, a call setting module, a summarization module, a profile-information collection module, an inline-expansion module, a size determination module, and a code conversion module. The program and the modules work with the CPU 1 to cause the computer 50 to function as an array generator 202, an extended-array generator 203, a mark setting unit 205, an initialization unit 210, a call setting unit 215, a summarization unit 220, a profile information collection unit 225, an inline-expansion unit 235, a size determination unit 240, and a code converter 245 to be described later. The computer program may be compressed or may be divided into multiple programs to be recorded in respective media.

The computer 50 receives inputs from input devices such as a keyboard 6 and a mouse 7 through a keyboard/mouse controller 5. The computer 50 also receives inputs from a microphone 24 through an audio controller 21 and outputs sounds from a speaker 23. The computer 50 is connected to a display device for presenting visual data to a user, through a graphics controller 10. The computer 50 is connected to a network through a network adapter 18 (Ethernet (registered trademark) card or a token ring card) or the like, and accordingly is capable of communicating with another computer and the like.

From the description above, it will be easily understood that the computer 50 is implemented as an information processing apparatus such as a standard personal computer, a workstation or a mainframe, or a combination of these information processing apparatuses. Note that the aforementioned components are merely examples, and not all these components are essential components for the present invention.

Figure 1B:
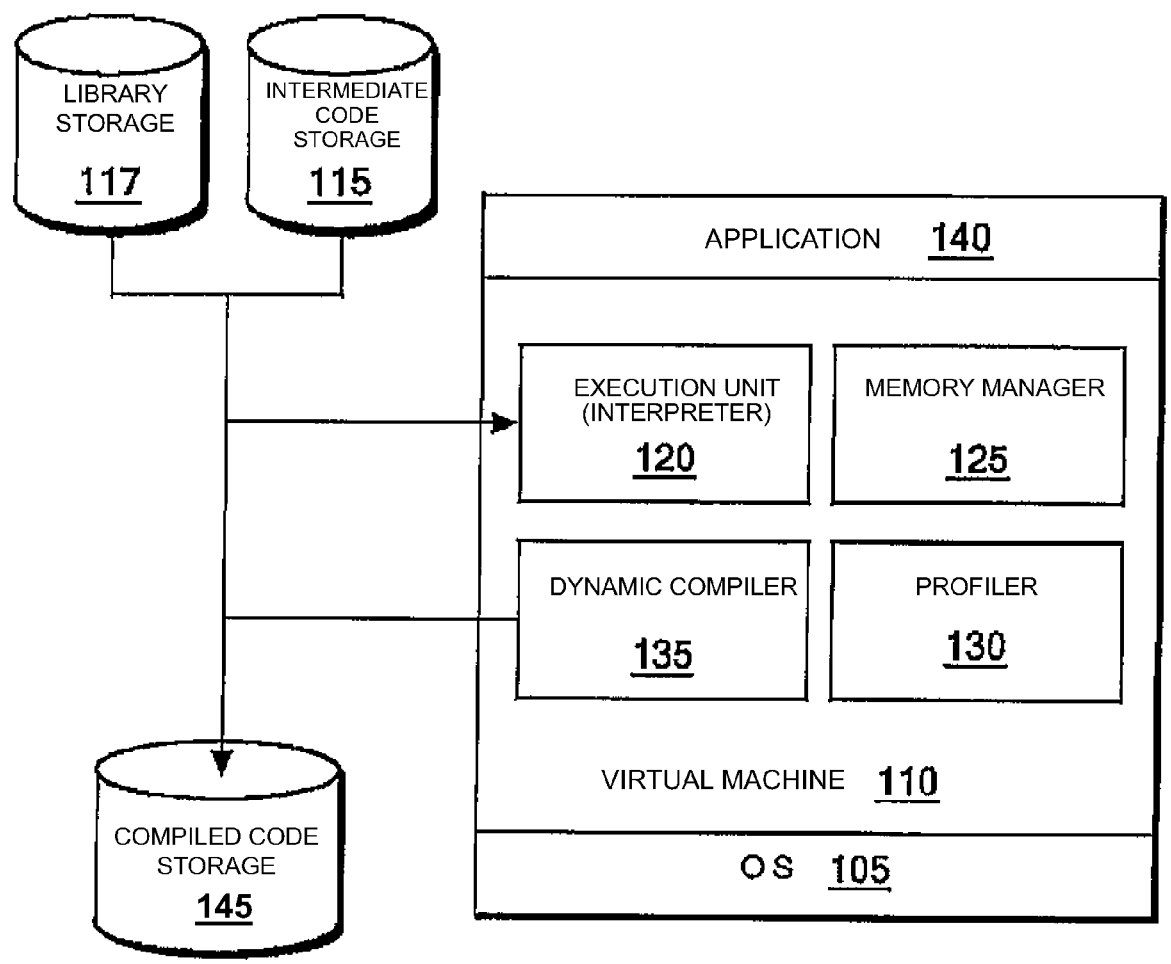
FIG. 1B shows an example of a software configuration of the computer 50 according to the embodiment of the present invention.

FIG. 1B is a block diagram showing a software configuration for implementing the present invention. In FIG. 1B, an operating system 105 manages the CPU and memories as resources and implements a multi-threaded function based on a time division. A virtual machine 110 is software configured to serve as an interface between an application 140 and the operating system 105. Layers which are equal to or lower than the virtual machine 110 when seen from the application 140 are made to serve as, for example, a Java (registered trademark) VM as a whole by the virtual machine 110. The virtual machine 110 includes: an execution unit (an interpreter) 120 configured to interpret intermediate code such as a bytecode when a program is provided as the intermediate code; a profiler 130 called depending on the interpretation; and a memory manager 125. The virtual machine 110 also includes a dynamic compiler 135 such as a JIT compiler. The virtual machine 110 dynamically compiles the bytecode into a machine language during the execution of the bytecode to generate native code, so that the execution of the program is sped up. Note that the intermediate code may include a description of an API. Upon detection of the description of the API in the intermediate code, the execution unit 120 calls a function of the API from a library to execute the function.

Meanwhile, the present invention is aimed to dynamically adjust an initial size of an array in an array extension pattern based on a profile result during the execution. However, when the initial size of the array is changed by computation processing of a computer without any special processing, the program might have a different meaning, depending on the case. Hence, it is necessary to find and optimize any part where the program does not have a different meaning even though the initial size of the array is changed. However, this is not practical, because an attempt to detect such a part by using only analysis performed by the dynamic compiler 135 involves heavy-weight inter-procedural analysis. Hence, the present invention newly introduces APIs for allocating arrays so that a programmer can easily specify such a part as an optimization target. The programmer allocates an array by using a newly defined API, instead of a new operator, so that a program (the virtual machine 110) for providing an execution environment can handle, as a special part, an array allocating part in an array extension pattern.

The newly introduced APIs are provided as part of a standard library. For each array of a primitive data type (an array of boolean[ ], byte[ ], char[ ], Object[ ] or the like in the Java (registered trademark) language), two types of methods are prepared: a method for allocating an array of an initial size (e.g., a "first API"); and a method for allocating an array of an extended size (e.g., a "second API"). Each method has a specification that "an array of an arbitrary size is returned by referring to a size specified by a first argument." However, in the method for allocating an array of an extended size, a second argument specifying an original pre-extension array is further prepared to embed a mechanism making it possible to give feedback of a result of profiling the array of the extended size to an allocation call context for the original array. The feedback mechanism will be described later in detail.

FIG. 3A shows an example of APIs newly introduced for an array of a character type. In the example shown in FIG. 3A, the new API is added to a java.lang.System class as a static method. In FIG. 3A, char[ ] getCharArrayOfBestSize(int) is the method for allocating an array of an initial size, and char[ ] extendCharArray(int, char[ ]) is the method for allocating an array of an extended size. Each method simply returns the array of the specified size unless the dynamic compiler 135 dynamically compiles the method during execution thereof.

Then, the getCharArrayOfBestSize method is converted by the dynamic compiler 135 during the execution into code using an access profiler as shown in FIG. 3B. Specifically, when being compiled during the execution, the getCharArrayOfBestSize method not only generates and initializes the array of the character type but also judges whether or not to perform sampling on the allocated array. When it is determined that the sampling is to be performed, the method is converted into the code by which the array is to be profiled by the access profiler. The code includes: processing or providing the array to be profiled with a mark indicating that the array is a profile target; and processing or reserving a profile information storage area. Allocation call context information of the allocated array is recorded in the profile information storage area. The allocation call context information is associated with profile information stored later in the profile information storage area.

Likewise, the extendCharArray method is converted by the dynamic compiler 135 during the execution into code using the access profiler as shown in FIG. 3C. Specifically, when being compiled during the execution, the extendCharArray method not only generates and initializes the array of the character type but also determines whether or not to perform sampling on the allocated array. When it is determined that the sampling is to be performed, the method is converted into the code by which the array is to be profiled by the access profiler. The code includes: processing or providing the array to be profiled with a mark indicating that the array is a profile target; and processing or reserving a profile information storage area. Note that the extendCharArray method for allocating an extended array records, in the profile information storage area, allocation call context information of the original array specified by using the second argument. The allocation call context information is associated with profile information stored later in the profile information storage area.

In order to use the aforementioned new APIs, the programmer only has to rewrite description in code parts where the arrays are directly generated by using the new operator to description for calling the methods in the new APIs. FIG. 4 shows a program obtained by rewriting the program of StringBuilder shown in FIG. 13 by using the new API. A code part (a) in FIG. 13 at which an array of an initial size of 16 is allocated by using the new operator corresponds to a code part (a') at which the getCharArrayOfBestSize method in FIG. 4 is called. A code part (b) in FIG. 13 at which an array of a double size is allocated by using the new operator corresponds to a code part (10') at which the extendCharArray method in FIG. 4 is called.

As described above, each newly introduced API is configured to simply return an array of a specified size unless otherwise dynamically compiled during the execution and needs to be configured not to show an API user, method implementation to prevent the user from writing implementation-dependent code. For example, as another method for specifying with an API, a code part where a program does not have a different meaning even though the initial size of an array is changed, use of an API of simply annotating a new statement is conceivable. However, with such an API, the present invention does not operate appropriately. The reason will be described below together with three design requirements for an API for appropriate operation of the present invention.

The first requirement is that the meaning in the Java (registered trademark) language should not be changed. For example, when a technique of specifying an allocation part by using an annotation is used as in the program shown in FIG. 14, the meaning in the Java (registered trademark) language is changed (an annotation to a statement is not allowed in the Java (registered trademark) language, but is herein assumed to be allowed for convenience of description). When the present invention is applied, a char array having elements more than or less than 16 depending on the case might be generated based on profile results in (a) of FIG. 14 for example, but this is inappropriate in the specifications of the Java (registered trademark) language. Hence, it is necessary to prepare an API configured not to show the Java (registered trademark) programmer a code part using new for an array by wrapping the code part by calling a method, like the two APIs described with reference to FIG. 3A.

The second requirement is high portability. For example, as shown in FIG. 15, a technique of providing APIs as a native library has a low portability in different CPUs and Java (registered trademark) VMs. For this reason, it is necessary to prepare an API configured to provide default implementation for simply returning an array of a specified size, like the two APIs described with reference to FIG. 3A.

The third requirement is that when an array is extended, feedback of profile information on the extended array should be able to be given to an allocation call context of allocating the original pre-extension array. In this embodiment, as described above, the method of allocating an array of an extended size is designed to have the second argument specifying the original pre-extension array. Since allocation call context information of the original array can be acquired based on the second argument, feedback of profile information on the extended array can be given to the allocation call context of the original array.

Referring back to FIG. 1B, in the present invention, the first and second APIs satisfying the aforementioned three requirements are prepared in a library storage 117 as part of a standard library and as the static methods, the first API allocating an array of a predetermined size, the second API extending the original array specified by the argument and allocating an array of a larger size than the original array. An intermediate code storage 115 stores therein intermediate code which is an execution target program including an array extension pattern rewritten by using the first and second APIs. The execution unit 120 interprets a program read from the intermediate code storage 115. Upon detection of description of the API, the execution unit 120 calls a corresponding API function from the library storage 117 to execute the function. The dynamic compiler 135 converts the first and second APIs during the execution into code by which each of allocated arrays is to be profiled based on the sampling frequency and an allocation call context of the pre-extension array is stored in a profile information storage area.

Figure 2:
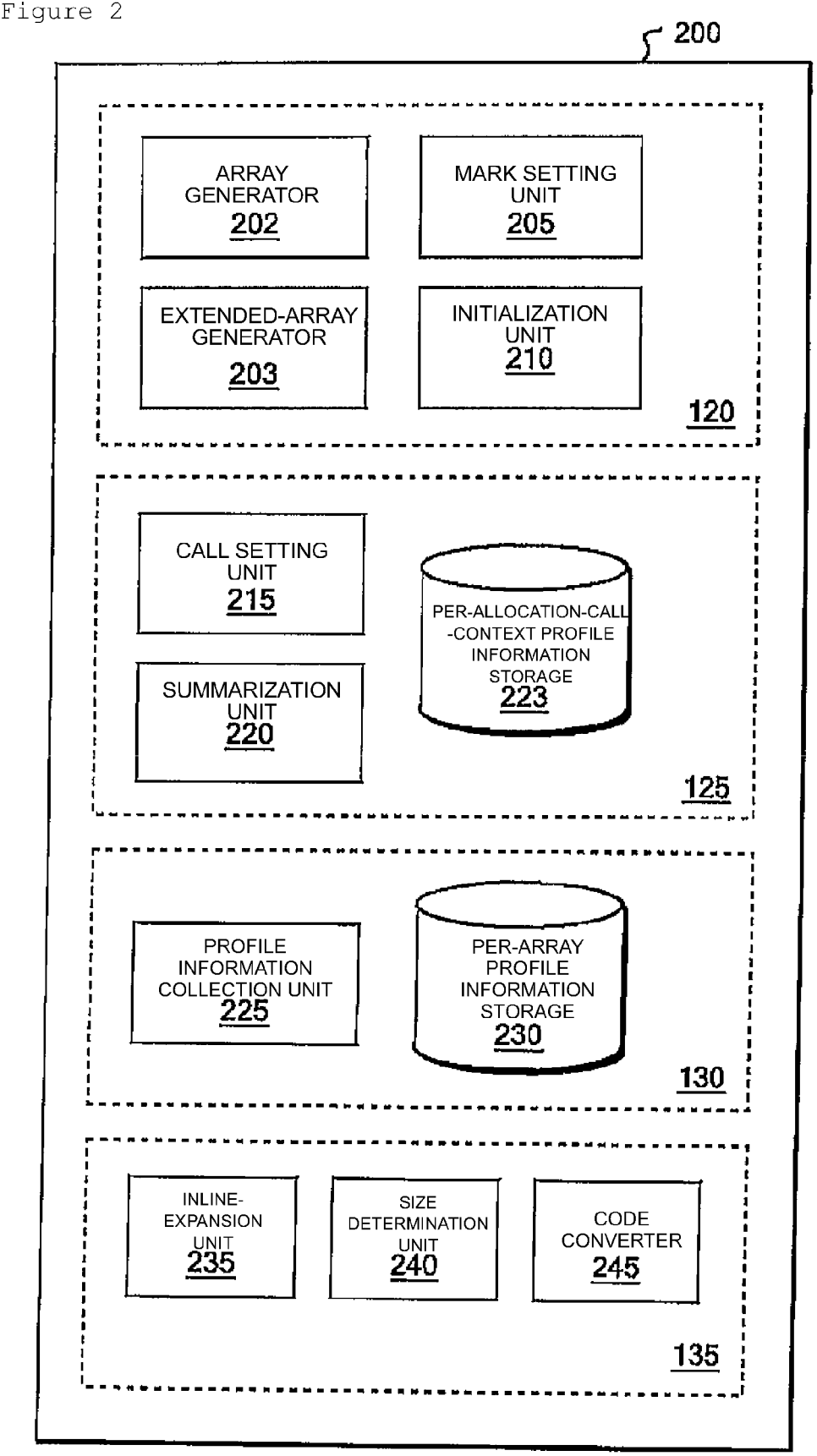
FIG. 2 shows a functional configuration of an adjustment apparatus 200 according to the embodiment of the present invention.

FIG. 2 shows a functional configuration of the adjustment apparatus 200 according to the embodiment of the present invention, the adjustment apparatus 200 having the hardware functions of the computer 50 shown in FIG. 1A and the software functions thereof shown in FIG. 1B. The adjustment apparatus 200 according to the embodiment of the present invention includes the array generator 202, the extended-array generator 203, the mark setting unit 205, the initialization unit 210, the call setting unit 215, the summarization unit 220, the profile information collection unit 225, the inline-expansion unit 235, the size determination unit 240, and the code converter 245. The adjustment apparatus 200 further includes a per-array profile information storage 230 configured to store profile information collected by the profile information collection unit 225, and a per-allocation-call-context profile information storage 223 configured to store profile information collected by the summarization unit 220 for each allocation call context. Note that functions of the array generator 202, the extended-array generator 203, the mark setting unit 205, and the initialization unit 210 may be implemented as functions of the execution unit 120 shown in FIG. 1B configured to call and execute the newly introduced APIs. Functions of the call setting unit 215, the summarization unit 220, and the per-allocation-call-context profile information storage 223 may be implemented as functions of the memory manager 125 shown in FIG. 1B. Functions of the profile information collection unit 225 and the per-array profile information storage 230 may be implemented as functions of the profiler 130 shown in FIG. 1B. Functions of the inline-expansion unit 235, the size determination unit 240, and the code converter 245 may be implemented as functions of the dynamic compiler 135 shown in FIG. 1B.

The array generator 202 generates an array of a predetermined size in response to a new array allocation request from the execution target program. In response to an array extension request from the execution target program, the extended-array generator 203 newly generates an array of a larger size than the predetermined size and copies values in elements of the original array to corresponding elements of the generated array. After generating the arrays, the array generator 202 and the extended-array generator 203 call the mark setting unit 205 to be described later. Each of the array generator 202 and the extended-array generator 203 passes on a pointer to the start of the corresponding generated array to the mark setting unit 205. At this time, the extended-array generator 203 further passes on, to the mark setting unit 205, information on the original array to be extended, which is received together with the array extension request. In this embodiment, the information on the original array is a pointer to the start of the original array.

When being called by the array generator 202 or the extended-array generator 203, the mark setting unit 205 determines whether or not the generated array is to be profiled, based on the sampling frequency. When determining that the array is to be profiled, the mark setting unit 205 sets a mark in the pointer to the start of the generated array, the mark indicating that the array is a profile target.

Here, the sampling frequency is a frequency at which one object is sampled every 1 MB allocation, for example. In addition, the mark setting may be performed, for example, in such a manner that an unused low bit of the pointer is used as a flag, or that an offset is added to the pointer so that an area other than a heap area can be pointed. After setting the mark, the mark setting unit 205 calls the initialization unit 210 to be described later to pass on the marked pointer to the start of the generated array and, as appropriate, the pointer to the start of the original pre-extension array.

When being called by the mark setting unit 205, the initialization unit 210 in advance generates and initializes profile information in predetermined data structures and stores the profile information in predetermined areas so that the summarization unit 220 and the profile information collection unit 225 to be described later can store collected profile information in the respective predetermined areas in the predetermined data structures. Here, the profile information in the predetermined data structures is prepared for efficiently storing the collected profile information. The profile information includes a per-array profile information structure used by the profile information collection unit 225 and a per-allocation-call-context profile information structure used by the summarization unit 220.

Immediately before or after the execution target program is started, the initialization unit 210 generates a hash table (hereinafter, referred to as a "first hash table"). The initialization unit 210 stores the first hash table in the per-array profile information storage 230, so that the generated per-array profile information structure can be registered in the first hash table with a pointer to the start of the corresponding array as key. Likewise, immediately before or after the execution target program is started, the initialization unit 210 generates a hash table (hereinafter, referred to as a "second hash table"). The initialization unit 210 stores the second hash table in the per-allocation-call-context profile information storage 223, so that the generated per-allocation-call-context profile information structure can be registered in the second hash table with the allocation call context as a key.

The per-array profile information structure has a first field and a second field, the first field storing a pointer to a per-allocation-call-context profile information structure corresponding to the allocation call context of the generated array, the second field storing an index of a last accessed-element of the array. Here, the last accessed-element means an element located at the end of elements accessed in the array. For example, if elements of an array T are accessed in the order of T[0], T[3], T[9], T[0], and T[2], the last accessed-element in the array takes on an index value of 9. In addition, an allocation call context of an allocated array means a calling order among methods to reach the array allocation.

For example, a program shown in FIG. 5A calls StringBuilder shown in FIG. 4 to allocate an array. An allocation call context of the array in this case is, for example, a context at the time of allocating the array in the third line in executing the program. In other words, the program MySample1.method1 shown in FIG. 5A calls a StringBuilder constructor in the third line, the constructor calls the getCharArrayOfBestSize method in the fourth line in the program shown in FIG. 4, and the getCharArrayOfBestSize method allocates the array in the method. Accordingly, the array allocation call context in this case is MySample1.

method1( )→java.lang.StringBuilder.<int>( )→java.lang.S ystem.getCharArrayOfBestSize(int).

A computer may hold an array allocation call context in any form of expression. For example, the array allocation call context may be held as a character string in which method names are combined in the calling order as described above, or as a pointer array in which pointers to method information structures indicating methods are combined in the calling order.

The per-allocation-call-context profile information structure is a data structure for summarizing values of the second field of the per-array profile information structure for each allocation call context, and has a form of a table to be extended as necessary. The table has entries of: a first field storing an index of a last accessed-element; and a second field storing the number or the allocation frequency of arrays allocated by using the value stored in the first field as an index of the last accessed-element and by using the allocation call context. FIG. 5B shows an example of a table summarizing results of profiling the array allocated by using the allocation call context MySample1. method1( )→java.lang.StringBuilder.<int>( )→java.lang.S ystem.getCharArrayOfBestSize(int).

When being called by the mark setting unit 205, the initialization unit 210 generates and initializes a per-array profile information structure for the newly allocated array to be accessed by using a received pointer. After generating the per-array profile information structure, the initialization unit 210 registers the per-array profile information structure in the first hash table by using the pointer to the start of the array as a key. At this time, the initialization unit 210 initializes a value of the second field of the generated per-array profile information structure to a value of −1. The initialization unit 210 also initializes a value of the first field of the generated per-array profile information structure according to an array generation request source.

When the array is generated by the array generator 202 in response to a new allocation request, the initialization unit 210 firstly checks whether or not a per-allocation-call-context profile information structure corresponding to the allocation call context of the array exists. When the corresponding per-allocation-call-context profile information structure exists, the initialization unit 210 sets a pointer to the corresponding per-allocation-call-context profile information structure in the first field of the generated per-array profile information structure. On the other hand, when the corresponding per-allocation-call-context profile information structure does not exist, the initialization unit 210 newly generates a per-allocation-call-context profile information structure and registers the per-allocation-call-context profile information structure in the second hash table by using the allocation call context of the array as a key. Then, the initialization unit 210 sets a pointer to the newly generated per-allocation-call-context profile information structure in the first field of the generated per-array profile information structure.

Note that the initialization unit 210 acquires the allocation call context information of an array by tracing a stack of a thread allocating the array. The stack is constituted of one or more frames respectively provided for methods which have not been completed, and the frames store status information (including method names) of the methods, respectively. The top frame of the stack is for a currently executed method, and a frame below the top frame is for a method which has called the currently executed method. As described above, the stack has one or more frames stacked from the bottom to the top in the order of calling the methods, respectively. The stack may be traced up to a main method at the bottom or to a frame of a predetermined number (the 20th frame, for example). After acquiring the allocation call context information, the initialization unit 210 acquires the per-allocation-call-context profile information structure from the second hash table by using the allocation call context as the key. If there is no hit of the allocation call context information in the stack, this means that a per-allocation-call-context profile information structure corresponding to the generated array has not been generated yet.

In contrast, when the array is generated by the extended-array generator 203 in response to an array extension request, the initialization unit 210 acquires the per-array profile information structure from the first hash table by using, as the key, the pointer to the start of the original pre-extension array received from the mark setting unit 205. Then, the initialization unit 210 reads out a pointer to a per-allocation-call-context profile information structure from the first field and sets the pointer in the first field of the generated per-array profile information structure.

The call setting unit 215 sets calling of the profiler 130 so that the profiler 130 can be called when an array is accessed by using a marked pointer. The calling is set by converting the (intermediate) code of the execution target program or by using a page protection feature. The call setting unit 215 employs the latter method, while the code converter 245 to be described later employs the former method. Thus, it should be noted that the adjustment apparatus 200 may include at least one of the call setting unit 215 and the code converter 245.

More specifically, the call setting unit 215 using the page protection feature sets read-write prohibition for a page pointed by a pointer provided with a mark indicating that the pointed array is a profile target, so that a signal handler can be called when the array is accessed by using the pointer. In this case, the signal handler serves as the profiler 130 to collect profile information. Here, the call setting unit 215 sets the calling of the profiler 130, for example, before or immediately after the execution target program is started.

In response to the calling of the profiler 130 or the signal handler, that is, in response to detection of access to the array set as the profile target, the profile information collection unit 225 collects profile information on the access to the array. The profile information collection unit 225 stores the collected profile information in the corresponding per-array profile information structure. More specifically, the profile information collection unit 225 refers to the first hash table stored in the per-array profile information storage 230 by using the pointer to the start of the accessed array as the key and thereby acquires the corresponding per-array profile information structure. Then, the profile information collection unit 225 reads out a value in the second field of the acquired per-array profile information structure and then compares the value with the index of the currently accessed element of the array. If the current index is larger than the value in the second field, the profile information collection unit 225 updates the value in the second field to the current index.

In response to discarding processing of the profile target array in garbage collection, the summarization unit 220 summarizes records of a corresponding per-array object information structure and stores the result in the corresponding per-allocation-call-context profile information structure. Specifically, the summarization unit 220 firstly acquires the per-array object information structure corresponding to a discarding target array from the first hash table stored in the per-array profile information storage 230, by using the pointer to the discarding target array as the key. The summarization unit 220 then acquires the per-allocation-call-context profile information structure stored in the per-allocation-callcontext profile information storage 223 and corresponding to a pointer value in the first field of the per-array object information structure by using the pointer value, and checks whether or not an entry corresponding to a value in the second field of the acquired per-array object information structure exists in the table which is the per-allocation-call-context profile information structure. When the corresponding entry exists, the summarization unit 220 increments a frequency value in the second field of the entry by one. When the corresponding entry does not exist, the summarization unit 220 adds an entry to the table of the acquired per-allocation-call-context profile information structure. The summarization unit 220 sets the value in the second field of the acquired per-array object information structure in the first field of the entry of the per-allocation-call-context profile information structure, and sets a value of 1 as the frequency in the second field of the entry.

The inline-expansion unit 235 is called, when the part of the intermediate code which is the execution target program is dynamically compiled. The inline-expansion unit 235 inline-expands the array allocation call context in the aforementioned part of the intermediate code, on condition that sufficient profile information on the array allocation call context is collected. For example, the inline-expansion unit 235 may determine that sufficient profile information on the context is collected when the total of frequencies of all the entries of the corresponding per-allocation-call-context profile information structure is larger than a predetermined threshold. After the inline-expansion processing, the inline-expansion unit 235 calls the size determination unit 240 to be described later.

When being called by the inline-expansion unit 235, the size determination unit 240 determines an initial size of the array to be allocated by the inline-expanded array allocation call context, based on the profile information collected for the context. Note that the collected profile information is the corresponding per-allocation-call-context profile information structure acquired by referring to the second hash table stored in the per-allocation-call-context profile information storage 223 by using the context as the key. The size determination unit 240 preferably determines, as the array allocation initial size, the largest index value in the index values which are collected access information. Alternatively, the size determination unit 240 may determine, as the array allocation initial size, an index value corresponding to the highest frequency in the index values which are collected access information.

Here, the inline-expansion processing performed by the inline-expansion unit 235 and the size determination processing performed by the size determination unit 240 are specifically described with reference to FIGS. 5A to 5C and FIGS. 6A to 6C. As described above, the program shown in FIG. 5A calls StringBuilder shown in FIG. 4 to allocate the array. It is assumed that the per-allocation-call-context profile information structure shown in FIG. 5B is acquired according to an allocation call context MySample1.method1( )→java.lang.StringBuilder.<int>( )→java.lang.S ystem.getCharArrayOfBestSize(int). Note that a predetermined threshold for determining the sufficient profile collection is 20.

Since the frequency total in the table shown in FIG. 5B is 25, the inline-expansion unit 235 inline-expands the context MySample1.method1( )→java.lang.StringBuilder.<int>( )→java.lang.S ystem.getCharArrayOfBestSize(int). Specifically, the inline-expansion unit 235 directly embeds a definition of the getCharArrayOfBestSize(int) method shown in FIG. 3B in the part for calling the StringBuilder( ) constructor of the program shown in FIG. 5A and acquires the code shown in FIG. 5C. At this time, since the largest index value is 1 in the table shown in FIG. 5B, the size determination unit 240 judges that the number of elements of 2 is large enough as the array size and determines 2 as the initial array allocation size. Note that as shown in FIG. 4, the initial array size has been 16.

The program shown in FIG. 6A also calls StringBuilder shown in FIG. 4 to allocate the array. The per-allocation-call-context profile information structure shown in FIG. 6B is acquired according to an allocation call context MySample2.method2( )→java.lang.StringBuilder.<int>( )→java.lang.S ystem.getCharArrayOfBestSize(int). Since the frequency total in the table shown in FIG. 6B is 24, the inline-expansion unit 235 inline-expands the context MySample2.method2( )→java.lang.StringBuilder.<int>( )→java.lang.S ystem.getCharArrayOfBestSize(int). Specifically, the inline-expansion unit 235 directly embeds a definition of the getCharArrayOfBestSize(int) method shown in FIG. 3B in the part for calling the StringBuilder( ) constructor of the program shown in FIG. 6A and acquires code shown in FIG. 6C. At this time, since the largest index value is 1659 in the table shown in FIG. 6B, the size determination unit 240 judges that the number of elements of 1660 is large enough as the array size, and determines 1660 as the initial array allocation size. Note that as shown in FIG. 4, the initial array size has been 16.

The code converter 245 is called in the dynamic compiling processing of the part of the intermediate code which is the execution target program. The code converter 245 sets the calling of the profiler 130 in response to a command for accessing the profile target array included in the aforementioned part of the intermediate code, so that the profiler 130 can be called when the array is accessed by using the pointer provided with the mark indicating the profile target. As described above, the code converter 245 sets the calling of the profiler 130 by converting the code. More specifically, the code converter 245 inserts the following code into any part before a command for accessing an array by using a pointer is described in the execution target program: code for judging whether or not a mark indicating that the array is a profile target is provided; and code for calling the profiler 130 according to a judgment result that the mark is provided.

Figure 7:
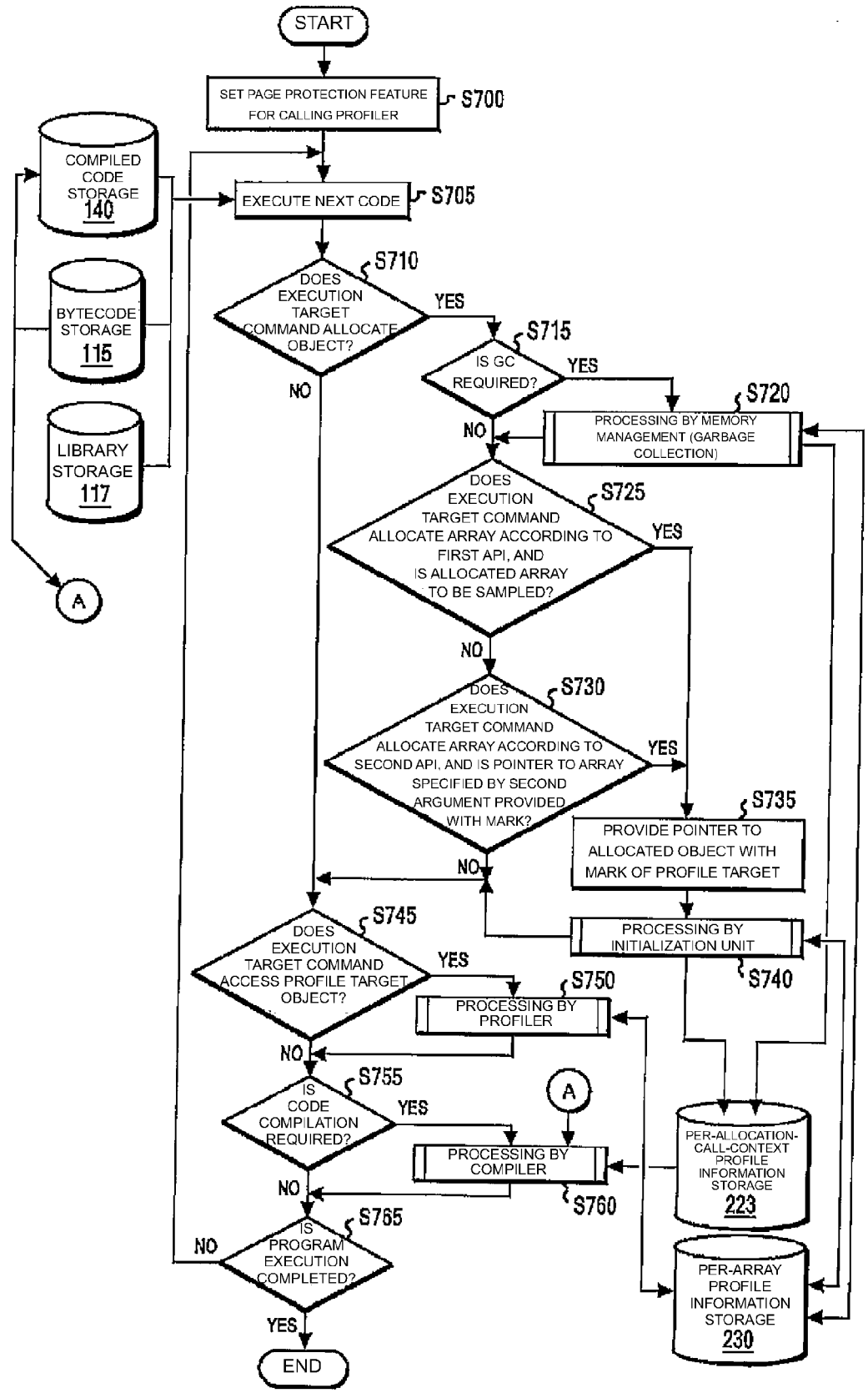
FIG. 7 shows an operation flow of the adjustment apparatus 200 according to the embodiment of the present invention.
Figure 8:
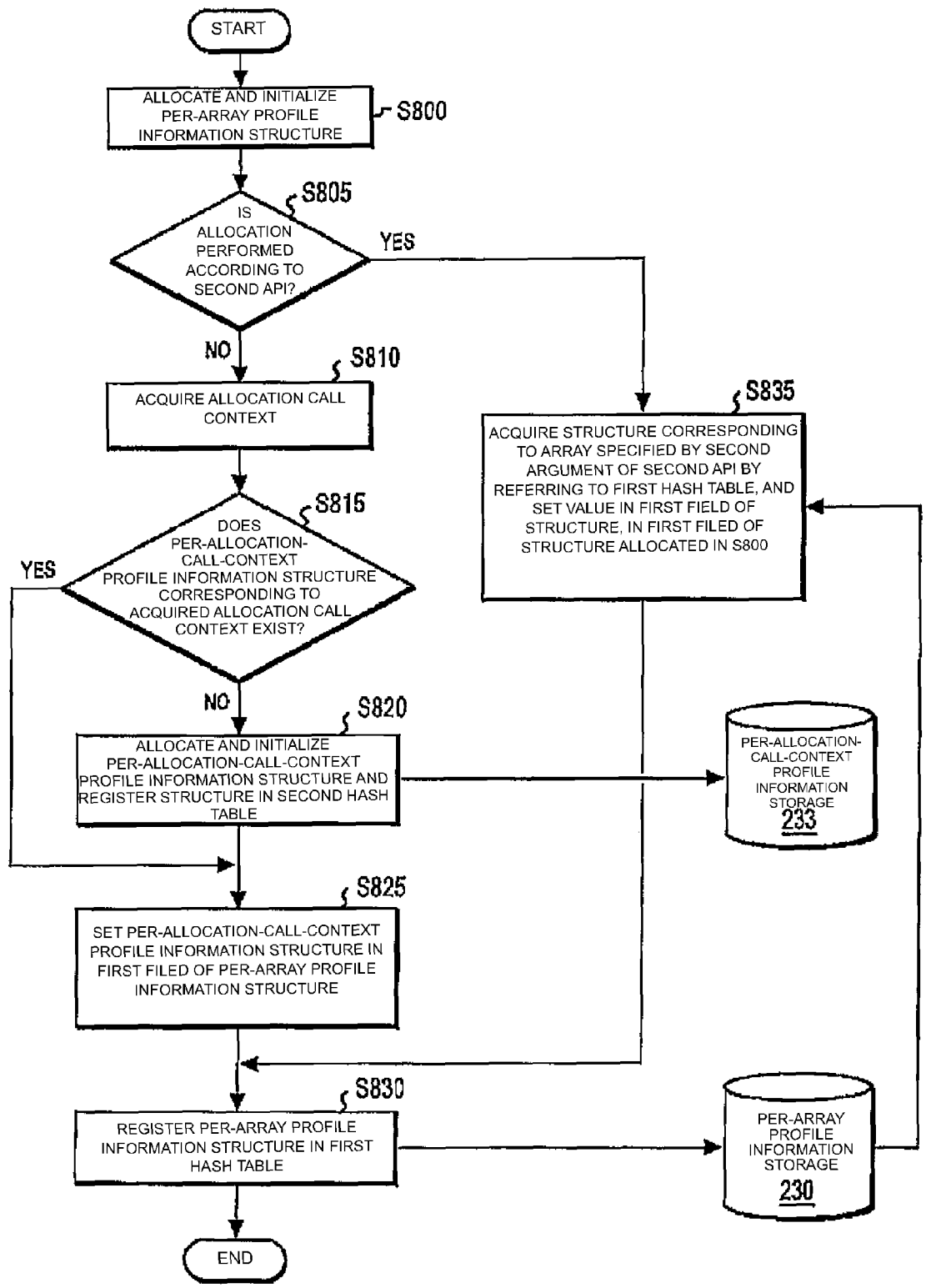
FIG. 8 shows an example of a detailed operation flow of processing performed by an initialization unit 210 in Step 740 shown in FIG. 7.
Figure 9:
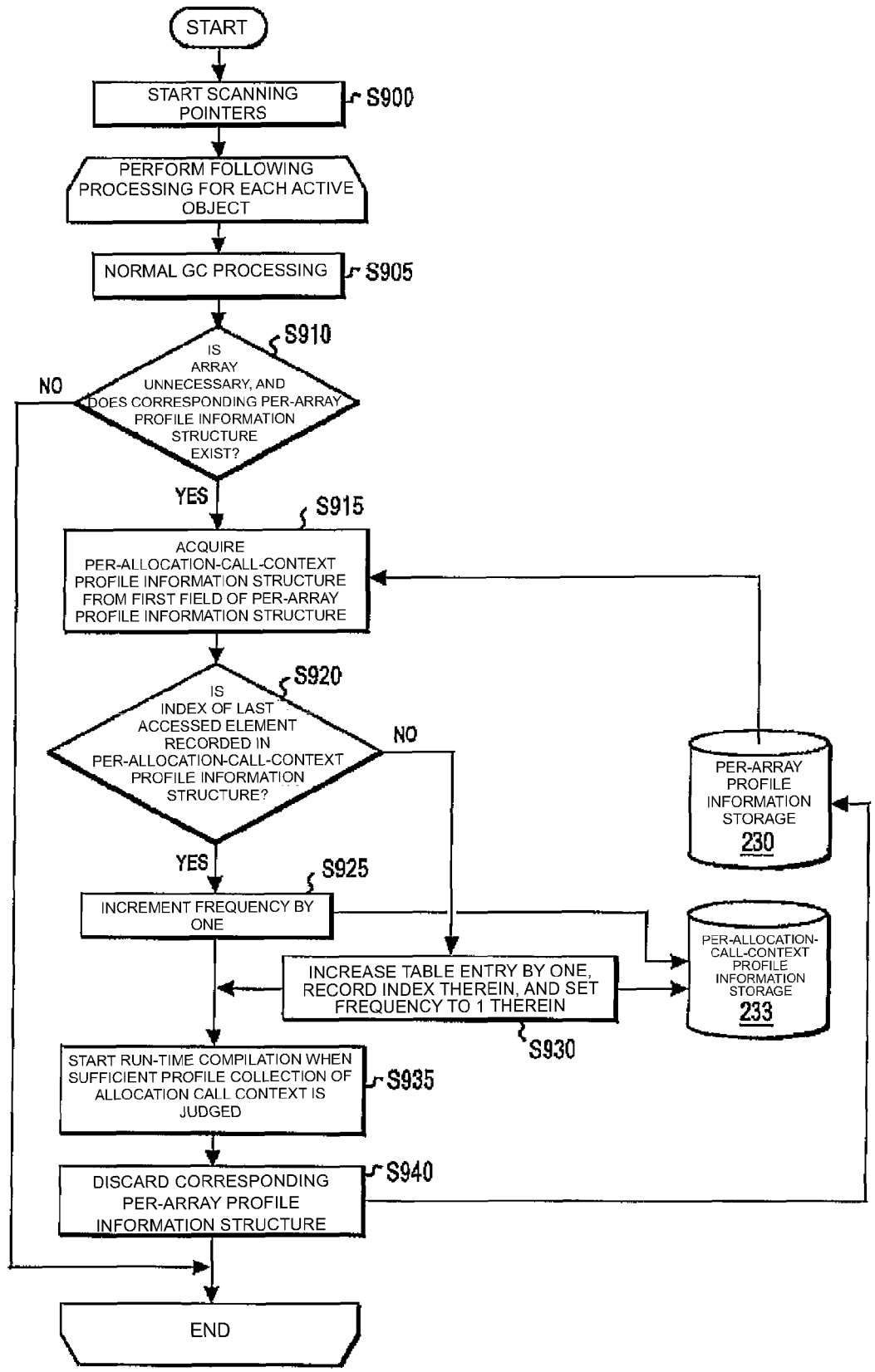
FIG. 9 shows an example of a detailed operation flow of processing performed by a memory manager 125 in Step 720 shown in FIG. 7.
Figure 10:
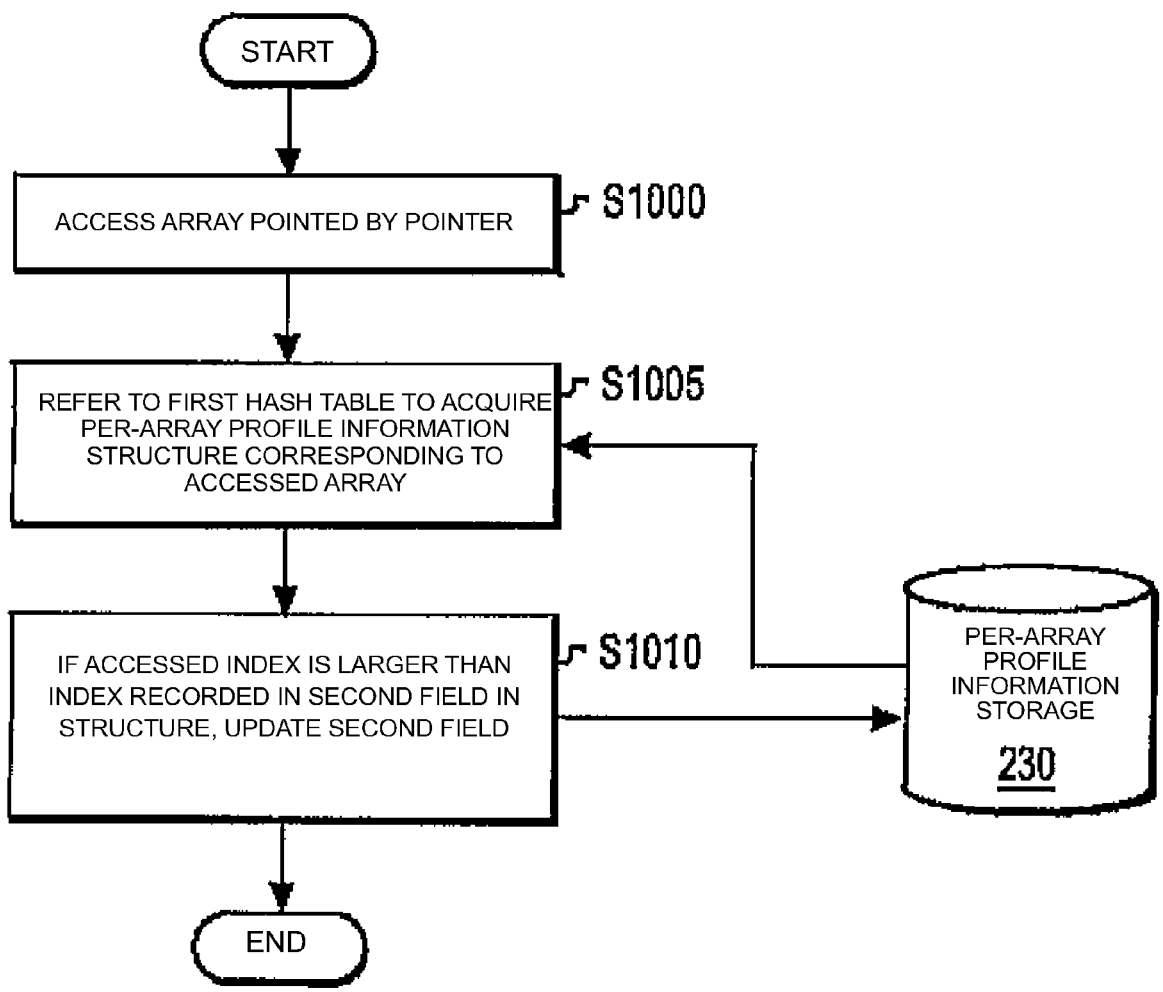
FIG. 10 shows an example of a detailed operation flow of processing performed by a profiler 130 in Step 750 shown in FIG. 7.
Figure 11:
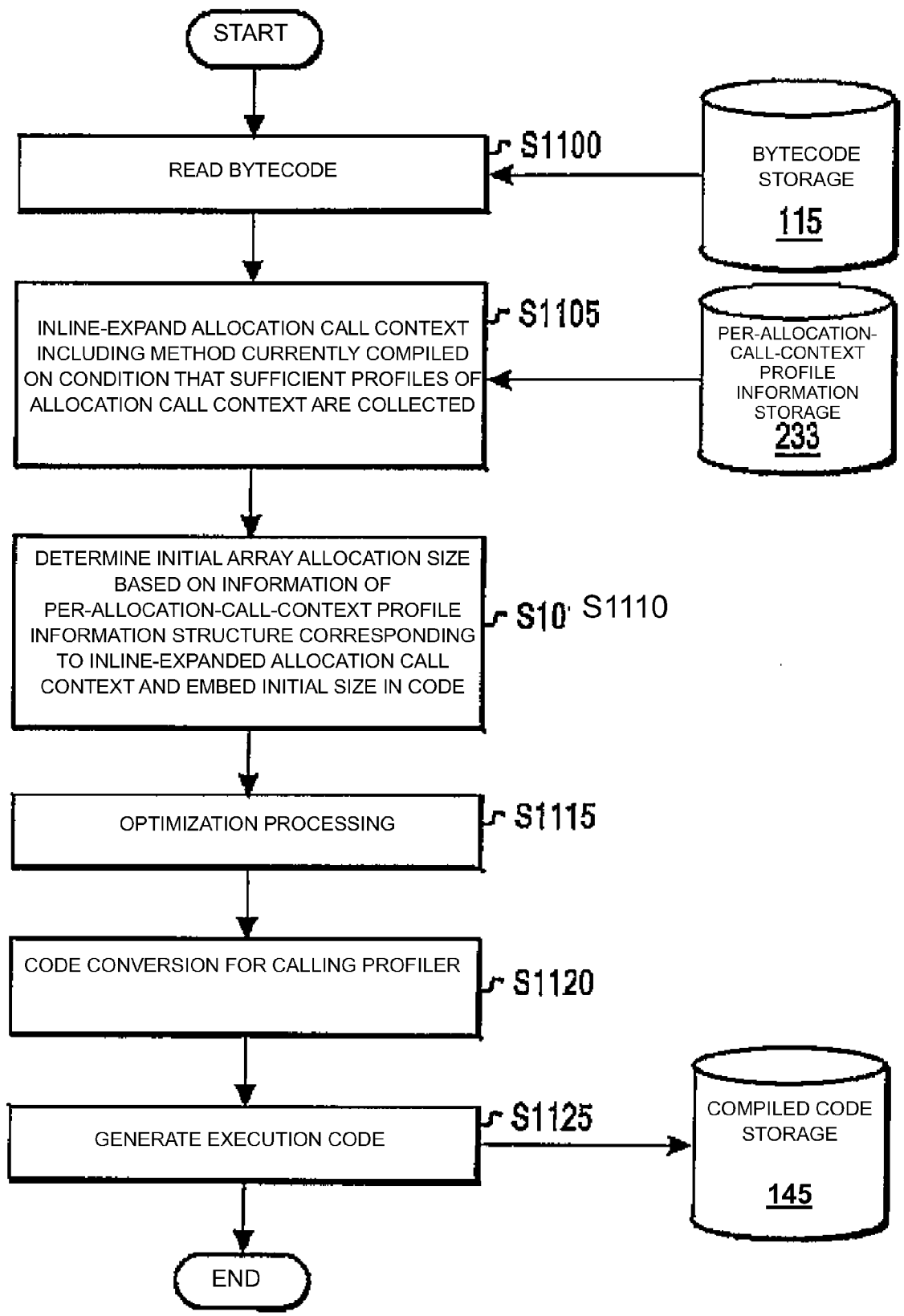
FIG. 11 shows an example of a detailed operation flow of another processing performed by a dynamic complier 135 in Step 760 in FIG. 7.

Next, an operation of the adjustment apparatus 200 will be described with reference to FIGS. 7 to 11. FIG. 7 shows an example of an operation flow of the adjustment apparatus 200 according to this embodiment. FIG. 8 shows an example of a detailed operation flow of processing performed by the execution unit 120 (the initialization unit 210) in Step 740 shown in FIG. 7. FIG. 9 shows an example of a detailed operation flow of processing performed by the memory manager 125 in Step 720 shown in FIG. 7. FIG. 10 shows an example of a detailed operation flow of processing performed by the profiler 130 in Step 750 shown in FIG. 7. FIG. 11 shows an example of a detailed operation flow of processing performed by the dynamic complier 135 in Step 760 in FIG. 7.

The operation flow of the adjustment apparatus 200 shown in FIG. 7 is started from Step 700. The execution unit 120 calls the memory manager 125 to cause the memory manager 125 to set the page protection feature for calling the profiler 130. Subsequently, the execution unit 120 starts execution of an execution target program (intermediate code) to acquire a command to be executed next (Step 705). Subsequently, the execution unit 120 judges whether or not the current command to be executed is a command for allocating an object (Step 710). When judging that the current command is the command for allocating an object (Step 710: YES), the execution unit 120 judges whether or not garbage collection is required (Step 715). When determining that the garbage collection is required (Step 715: YES), the execution unit 120 calls the memory manager 125 to cause the memory manager 125 to execute the processing. The details of the processing by the memory manager 125 will be described later with reference to FIG. 9.

After the processing by the memory manager 125, the execution unit 120 then judges whether or not both the following conditions are satisfied: the command to be executed is a command for allocating an array according to the first API allocating an array of a predetermined size; and the array to be allocated by the command is to be sampled based on a sampling frequency (Step 725). When the command is not the command for allocating an array according to the first API, or when the command is the command for allocating an array according to the first API but the array is not to be sampled (Step 725: NO), the processing proceeds to Step 730. Subsequently, the execution unit 120 judges whether or not both the following conditions are satisfied: the command to be executed is a command for allocating an extended array according to the second API extending the original array specified by using the second argument; and a pointer to the start of the original array specified by the second argument is provided with a mark indicating that the array is a sampling target. When the command is not the command for allocating an array by the second API or when the command is the command for allocating an array by the second API but the received pointer is not provided with the mark (Step 730: NO), the processing proceeds to Step 745. Here, when the command is judged at least as the command for allocating an array according to the first API in Step 725 or at least as the command for allocating an extended array according to the second API in Step 730, the execution unit 120 allocates a corresponding requested array.

When an affirmative judgment result is obtained in Step 725 or Step 730 (Step 725: YES, or Step 730: YES), processing proceeds to Step 735. Then the execution unit 120 provides a pointer to the start of the array allocated in Step 725 or Step 730 with a mark indicating that the array is a profile target. Subsequently, the execution unit 120 performs initialization on the array determined as the profile target (Step 740). The details of the initialization will be described later with reference to FIG. 8.

After Step 740, when the current command is judged in Step 710 as not the command for allocating an object (Step 710: NO) or when a negative judgment result is obtained in Step 730 (Step 730: NO), the processing proceeds to Step 745. Then, the execution unit 120 judges whether or not the current command is a command for accessing the sampled array, that is, the profile target array. When the command is judged as the command for accessing the profile target array (Step 745: YES), the execution unit 120 calls the profiler 130 to cause the profiler 130 to execute the processing (Step 750). The details of the processing by the profiler 130 will be described later with reference to FIG. 10.

After Step 750, or when the current command is judged in Step 745 as not the command for accessing the profile target array (Step 745: NO), the processing proceeds to Step 755. Then, the execution unit 120 judges whether or not an intermediate code part to be executed next needs to be dynamically compiled. When determining that the dynamic compilation is required (Step 755: YES), the execution unit 120 calls the dynamic compiler 135 to cause the dynamic compiler 135 to execute the processing (Step 760). The details of the processing by the dynamic compiler 135 will be described later with reference to FIG. 11.

After Step 760, or when the execution unit 120 determines in Step 755 that the dynamic compilation is not required (Step 750: NO), the processing proceeds to Step 765. Then, the execution unit 120 judges whether or not the execution of the execution target program is completed. When the execution of the execution target program is not completed (Step 765: NO), the processing returns to Step 705. On the other hand, when the execution of the program is completed (Step 765: YES), the operation flow of the adjustment apparatus 200 is terminated.

The operation flow of the processing shown in FIG. 8 performed by the initialization unit 210 is started from Step 800. The initialization unit 210 generates a per-array profile information structure for the array having the pointer to which is provided with the mark in Step 735 shown in FIG. 7, and initializes the second field of the per-array profile information structure to a value of −1. Subsequently, the initialization unit 210 judges whether or not the array allocation is performed according to the second API extending the original array specified by the second argument (Step 805). When the array allocation is not performed according to the second API (Step 805: NO), the initialization unit 210 then traces the stack of threads of allocating the array to acquire an allocation call context allocating the array (Step 810). Subsequently, the initialization unit 210 refers to the second hash table stored in the per-allocation-call-context profile information storage 223 by using the allocation call context allocating the array as the key, and thereby judges whether or not a corresponding per-allocation-call-context profile information structure exists in the second hash table (Step 815).

When the corresponding per-allocation-call-context profile information structure does not exist in the second hash table (Step 815: NO), the initialization unit 210 newly generates a per-allocation-call-context profile information structure corresponding to the array allocation call context and registers the context in the second hash table by using the context as the key (Step 820). On the other hand, when the corresponding per-allocation-call-context profile information structure exists in the second hash table (Step 815: YES), or after Step 820, the initialization unit 210 sets a pointer to the corresponding per-allocation-call-context profile information structure in the first field of the per-array profile information structure generated in Step 800.

On the other hand, when it is judged in Step 805 that the array allocation is performed according to the second API (Step 805: YES), the initialization unit 210 refers to the first hash table stored in the per-array profile information storage 230 by using, as the key, the pointer to the original pre-extension array specified by the second argument of the second API to acquire a corresponding per-array profile information structure. Then, the initialization unit 210 sets a pointer to the per-allocation-call-context profile information structure stored in the first field of the acquired per-array profile information structure, in the first field of the per-array profile information structure generated in Step 800. The processing proceeds to Step 830 from Step 825 or Step 835. Then, the initialization unit 210 registers the per-array profile information structure generated in Step 800 in the first hash table in the per-array profile information storage 230 by using the pointer to the start of the array as the key. Thereafter, the processing is terminated.

The operation flow of the processing shown in FIG. 9 performed by the memory manager 125 is started from Step 900. In order to detect all the currently used objects generated in a heap area, the memory manager 125 scans a tree structure showing a pointer reference relationship among objects and repeatedly performs the following series of processing for each pointer to a currently used object. The memory manager 125 firstly executes normal garbage collection for the current pointer (Step 905). Since the algorithm of the normal garbage collection is a well-known technique and is not the gist of the present invention, a detailed description will be omitted.

Subsequently, the memory manager 125 judges whether or not both the following conditions are satisfied: it is determined that the array object is to be discarded in the garbage collection processing performed in Step 905; and a per-array profile information structure corresponding to the array object determined as being discarded exists in the first hash table stored in the per-array profile information storage 230 (Step 910). When a negative judgment result is obtained (Step 910: NO), the processing of the current pointer is terminated. On the other hand, when an affirmative judgment result is obtained (Step 910: YES), the memory manager 125 acquires a pointer to a per-allocation-call-context profile information structure from the first field of the per-array profile information structure corresponding to the array to be discarded (Step 915). Then, the memory manager 125 judges whether or not an entry corresponding to an index value stored in the second field of the per-array profile information structure corresponding to the array to be discarded exists in the table pointed by the pointer (Step 920).

When it is judged that the corresponding entry exists (Step 920: YES), the memory manager 125 increments the frequency value of the second field in the entry by one (Step 925). On the other hand, when it is judged that the corresponding entry does not exist (Step 920: NO), the memory manager 125 adds an entry to the table pointed by the pointer and acquired in Step 915. The memory manager 125 sets: in the first field of the entry, the index value stored in the second field of the per-array profile information structure corresponding to the array to be discarded; and a frequency value of 1 in the second field of the entry (Step 930).

After Step 925 or Step 930, the memory manager 125 calls the dynamic compiler 135 to cause the dynamic compiler 135 to perform dynamic compilation on condition that it is judged that sufficient profiles of the allocation call context allocating the array to be discarded are collected. The details of the dynamic compilation by the dynamic compiler 135 will be described later with reference to FIG. 11. Subsequently, the memory manager 125 deletes the per-array profile information structure corresponding to the array to be discarded, from the first hash table stored in the per-array profile information storage 230 (Step 940). After the aforementioned series of processing is completed for all the pointers pointing currently used objects, the processing is terminated.

The operation flow of the processing shown in FIG. 10 performed by the profiler 130 is started from Step 1000. The profiler 130 accesses the array specified by the current object access command causing the calling of the profiler 130. Subsequently, the profiler 130 refers to the first hash table stored in the per-array profile information storage 230 by using the pointer to the start of the accessed array as the key and thereby acquires a corresponding per-array profile information structure (Step 1005). Subsequently, the profiler 130 compares an index value of an array element to be accessed in response to the current object access command and an index value stored in the second field of the acquired per-array profile information structure. When the index value of the array element to be accessed is larger than the index value stored in the second field, the profiler 130 updates the value in the second field to the larger index value (Step 1010). Then, the processing is terminated.

The operation flow of the processing shown in FIG. 11 performed by the dynamic compiler 135 is started from Step 1100. The dynamic compiler 135 reads a code part to be executed next in the execution target program from the intermediate code (bytecode) storage 115. Subsequently, the dynamic compiler 135 inline-expands an allocation call context included in the code part which is a compilation target on condition that sufficient profiles of allocation call context are collected in the per-allocation-call-context profile information storage 223 (Step 1105).

Subsequently, the dynamic compiler 135 acquires a per-allocation-call-context profile information structure corresponding to the inline-expanded allocation call context, and embeds the largest index value in the values of indexes recorded in the per-allocation-call-context profile information structure as the initial array allocation size in the inline-expanded code (Step 1110). Subsequently, the dynamic compiler 135 performs optimization on code parts other than the aforementioned allocation call context (Step 1115). There are multiple types of optimization, and algorithms thereof are known techniques and are not the gist of the present invention. Thus, a detailed description is herein omitted.

Subsequently, the dynamic compiler 135 converts the compilation target code part to the code for calling the profiler 130 (Step 1120). Subsequently, the dynamic compiler 135 compiles the code parts other than the allocation call context to generate native code (Step 1125). Then, the processing is terminated.

Experiment

1. Implementation

An adjustment program according to the embodiment of the present invention was implemented on an IBM's Java (registered trademark) VM provided, as hardware, with: an RISC processor of an operating frequency of up to 4.7 GHz (quad-core POWER6 (trademark), with each core including a two-thread SMT engine); and a heap memory space two times as large as a minimum heap memory space required by benchmarks used in the experiments. The Java (registered trademark) VM uses Linux (trademark) 2.6.18 as an operating system. Note that a sampling frequency of allocating one array every 8 MB allocation was used in the implemented program. In addition, eight bench mark programs (fop, jython, lusearch, pmd, sunflow, tomcat, xalan, and Geo.mean) of allocating a large number of objects were selected from the DaCapo benchmark suite. Moreover, array allocation in two classes of benchmarks java.lang.StringBuilder, java.io, BufferedReader, lusearch in the Java (registered trademark) standard library and three classes of a benchmark xalan were rewritten to ones using the APIs newly introduced in the present invention.

2. Experiment Results

Figure 12:
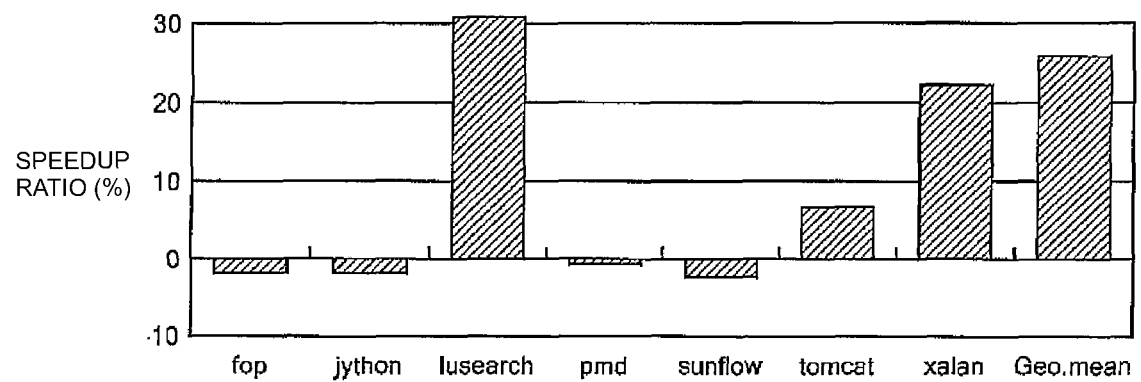
FIG. 12 shows experiment results of speedup ratios.

FIG. 12 shows experiment results of speedup ratios. As shown in FIG. 12, maximum speedup by up to 300% or higher (four times or higher) were observed in some benchmarks. Incidentally, the maximum performance deterioration was 2.2%, which is attributable to overhead of an access profiler.

Although the present invention has been described by use of the embodiment hereinabove, the technical scope of the present invention is not limited to the above description of the embodiment. It will be apparent to those skilled in the art that modifications and improvements can be made to the above embodiment. Accordingly, such modified or improved embodiments are also included in the technical scope of the present invention, as a matter of course.

It should be noted that an explicit description by specially stating "before," "prior to," or the like is not provided to the order of executing various processing such as operations, procedures, steps, stages and the like in the device, the system, the program, and the method which are shown in the scope of claims, the specification, and the drawings, and thus the processing can be achieved in any order except a case where output of preceding processing is used for subsequent processing. It should also be noted that even if output of the preceding processing is used for the subsequent processing, another processing may be performed between the preceding processing and the subsequent processing and that even if a description is given that another processing is to be performed therebetween, the order may be changed to perform the preceding processing immediately before the aforementioned subsequent processing. Even if a description is given of a flow of operations in the scope of claims, the specification, and the drawings by conveniently using "firstly," "next," "subsequently," or the like, the description does not mean that the operations indispensably need to be performed in the order.

The invention claimed is:

1. An adjustment program programmed in computer-readable storage media for dynamically adjusting an initial size of an array, the program causing a computer to execute the steps of:
   (a) allocating an array of a predetermined size in response to an array allocation request from an execution target program, and storing allocation call context information of the array into a profile information storage area of the array, by a first application programming interface;
   (b) newly allocating as an extended array, an array of a larger size than the predetermined size in response to a request to extend the size of the allocated array from the execution target program, storing the allocation call context information of the original pre-extension array instead of allocation call context information of the extended array into the profile information storage area of the extended array to provide feedback of profile information of the extended array to the allocation call context information of the original pre-extension array, by a second application programming interface;
   (c) in response to an access to a profile target array during execution of the execution target program, storing access information into the profile information storage area of the profile target array;
   (d) collecting the access information stored in the profile information storage areas of arrays for each array allocation call context; and
   (e) in response to dynamic compilation of a code part to be executed next in the execution target program, inline-expanding an array allocation call context included in the code part, and embedding an array size determined based on the access information collected for the context, as an allocation initial size of the array, into the inline-expanded code.

2. The adjustment program according to claim 1, wherein
   the access information stored in the profile information storage area of each of the arrays is an index value of an element located at the end in accessed elements of the each array, and
   the step (e) comprises the step of determining, as the allocation initial size of the array, the largest index value in a plurality of index values which are the collected access information.

3. The adjustment program according to claim 1, wherein
   the access information stored in the profile information storage area of each of the arrays is an index value of an element located at the end in accessed elements of the each array, and
   the step (e) comprises the step of determining, as the allocation initial size of the array, an index value corresponding to the highest frequency in a plurality of index values which are the collected access information.

4. The adjustment program according to claim 1, wherein
   the profile information storage area of each of the arrays is associated with a pointer to the start of the each array, and
   the step (b) comprises the steps of receiving the pointer to the start of the array as well as a request for size extension of the array and acquiring array allocation call context information of the original array by using the pointer, the array allocation call context information being stored in the profile information storage area of the original array.

5. The adjustment program according to claim 1, wherein the collection in the step (d) is performed on the profile target array which is to be discarded in garbage collection processing.

6. An information processing apparatus for dynamically adjusting an initial size of an array, the information processing apparatus comprising:
   a storage device;
   an execution target program stored in the storage device;
   an execution unit configured to interpret the execution target program, and call and execute a function of an application programming interface (API) in response to detection of description of the API;
   a first API and a second API that are callable by the execution unit, the first API configured to allocate an array of a predetermined size, the second API configured to receive, as an argument, information of an array to be extended, and to allocate an array of a larger size than the array of the predetermined size, the first and second APIs being to be converted, in execution thereof, into code to determine an allocated array as a profile target depending on a sampling frequency and to store an array allocation call context of the pre-extension array instead of allocation call context information of the allocated array into a profile information storage area of the allocated array to provide feedback of profile information of the allocated array to allocation call context information of the pre-extension array;
   a profiler that is callable by the execution unit in response to detection of an access to a profile target array, and is configured to store information of the access to the array into the profile information storage area corresponding to the array to which the access is detected; and
   a dynamic compiler configured to dynamically compile a code part to be executed next in the execution target program, to inline-expand an array allocation call context included in the code part, and to embed an array size determined based on all the access information associated with the context, as an allocation initial size of the array, into the code part.

7. The information processing apparatus according to claim 6, wherein
   the access information stored in the profile information storage area of the array is an index value of an element located at the end in accessed elements of the array, and
   the dynamic compiler determines, as the allocation initial size of the array, the largest index value in a plurality of index values which are the all the access information associated with the inline-expanded context.

8. The information processing apparatus according to claim 6, wherein
   the access information stored in the profile information storage area of the array is an index value of an element located at the end in accessed elements of the array, and
   the dynamic compiler determines, as the allocation initial size of the array, a value of index value corresponding to the highest frequency in a plurality of index values which are all the access information associated with the inline-expanded context.

9. The information processing apparatus according to claim 6, wherein the second API acquires the allocation call context information of the pre-extension array from the profile information storage area corresponding to the array, by using the information of the array to be extended which is received as the argument.

10. The information processing apparatus according to claim 6, wherein the first and second APIs are prepared for each primitive type array.

11. The information processing apparatus according to claim 6, wherein the first and second APIs are each prepared as part of a standard library and a static method.

12. The adjustment program according to claim 1, wherein array extension processing is reduced based on the feedback.

13. The information processing apparatus according to claim 6, wherein array extension processing is reduced based on the feedback.

* * * * *